3,242,041
METHOD FOR KILLING FUNGI WITH VINYL SULFONES
Paul C. Aichenegg, Prairie Village, Kans., and Carl D. Emerson, Kansas City, Mo., assignors to Chemagro Corporation, New York, N.Y., a corporation of New York
No Drawing. Filed July 21, 1964, Ser. No. 384,251
10 Claims. (Cl. 167—30)

This application is a continuation-in-part of application Serial No. 73,229, filed December 2, 1960, now Patent No. 3,144,383, dated August 11, 1964.

The present invention relates to novel fungicidal compositions and methods for killing fungi.

It is an object of the present invention to develop an improved process for combatting fungi.

Still further objects and the entire scope of applicability of the present invention will become apparent from the detailed description given hereinafter; it should be understood, however, that the detailed description and specific examples, while indicating preferred embodiments of the invention, are given by way of illustration only since various changes and modifications within the spirit and scope of the invention will become apparent to those skilled in the art from this detailed description.

It has now been found that these objects can be attained by applying to the habitat of the fungi a compound having the formula $RSO_2CH=CH_2$ where R is carbocyclic aryl or substituted carbocyclic aryl such as phenyl, naphthyl, halophenyl, nitrophenyl, alkyl phenyl and alkoxy phenyl.

A preferred class of compounds is phenyl vinyl sulfone and ring substituted phenyl vinyl sulfones.

As examples of sulfones which can be used as fungicides according to the invention there are phenyl vinyl sulfone, α-naphthyl vinyl sulfone, β-naphthyl vinyl sulfone, 2-chlorophenyl vinyl sulfone, 3-chlorophenyl vinyl sulfone, 4-chlorophenyl vinyl sulfone, 3,4-dichlorophenyl vinyl sulfone, 2,4-dichlorophenyl vinyl sulfone, 3-bromophenyl vinyl sulfone, 2-chloro-4-bromophenyl vinyl sulfone, 4-iodophenyl vinyl sulfone, 3-fluorophenyl vinyl sulfone, 2-methylphenyl vinyl sulfone, 3-methylphenyl vinyl sulfone, 4-methylphenyl vinyl sulfone, 3-octylphenyl vinyl sulfone, 4-tertiary-butylphenyl vinyl sulfone, 4-n-butylphenyl vinyl sulfone, 4-t-amylphenyl vinyl sulfone, 4-secondary amylphenyl vinyl sulfone, 4-n-amylphenyl vinyl sulfone, 4-nitrophenyl vinyl sulfone, 3-nitrophenyl vinyl sulfone, 2-nitrophenyl vinyl sulfone, 2-chloro-4-nitrophenyl vinyl sulfone, 3-methoxyphenyl vinyl sulfone, 4-ethoxyphenyl vinyl sulfone, 2-butoxyphenyl vinyl sulfone, 2,4-dimethylphenyl vinyl sulfone, 3,4-dimethylphenyl vinyl sulfone, 4-ethylphenyl vinyl sulfone, and 2,4-dinitrophenyl vinyl sulfone.

Many of the above compounds are known. The others can be prepared by conventional procedures. Thus, they can be prepared by reacting aryl or substituted aryl sulfenyl chlorides with ethylene followed by dehydrochlorination of the formed β-chloroethyl aryl (or substituted aryl) sulfides before or after their oxidation to the desired sulfones.

The compounds included as fungicides vary from highly viscous oils to solids.

The compounds of the present invention can be used alone as fungicides or they can be applied together with inert solids to form dusts, or can be suspended in a suitable liquid diluent, preferably comprising water.

There can also be added surface active agents or wetting agents and/or inert solids in the liquid formulations. In such case, the active ingredient can be from 0.01 to 95% by weight of the entire composition.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol methanol, isopropanol, amyl alcohol, ethylene glycol, propylene glycol, butyl carbitol acetate and glycerine. Mixtures of water and organic solvents, either as solutions or emulsions, can be employed.

The novel fungicides can also be applied as aerosols, e.g., by dispersing them in air by means of a compressed gas such as dichlorodifluoromethane or trichlorofluoromethane and other Freons, for example.

The fungicides of the present invention can also be applied with adjuvants or carriers such as talc, pyrophyllite, synthetic fine silica, attapulgus clay (attaclay), kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

As stated, it is frequently desirable to incorporate a surface active agent in the fungicidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid (di-2-ethylhexyl), ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey Red Oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1,000), sorbitan sesquioleate, polyethylene glycol ester of tall oil acids, sodium octyl phenoxyethoxyethyl sulfate, tris (polyoxyethylene) sorbitan monostearate (Tween 60), and sodium dihexyl sulfosuccinate.

The solid and liquid formulations can be prepared by any of the conventional procedures. Thus, the active ingredient, in finely divided form if a solid, may be tumbled together with finely divided solid carrier. Alternatively, the active ingredient in liquid form, including solutions, dispersions, emulsions and suspensions thereof, may be admixed with the solid carrier in finely divided form.

The compounds of the present invention can be applied to soil, growing plants, e.g., trees, cotton plants, wheat and other grain plants, vegetable plants, seeds and fabrics to give fungicidal protection.

Unless otherwise indicated, all parts and percentages are by weight.

EXAMPLE 1
*Phenyl vinyl sulfone*

0.25 M diphenyl disulfide, made from 55 g. (0.5 M) PhSH and $I_2$, were dissolved in 4–500 ml. $CCl_4$, 17.7 g. (0.25 M) chlorine gas were introduced at 0 to $-5°$ C. during 30–40 minutes and the formed orange-red $CCl_4$ solution of the phenylsulfenyl chloride cooled to between $-15°$ C. to $-20°$ C. Then 14 to 16 g. of ethylene gas (slight excess) were introduced during 40 to 60 minutes keeping the reaction temperature between $-10$ and $-15°$ C. The color of the reaction mixture gradually changed from deep orange-red to faintly yellow at the end of the reaction and was allowed to warm to room temperature. Standing overnight and stripping yielded 84 g. (98% yield) of practically pure 2-chloroethylphenylsulfide, $n_{D22}$ 1.5812. All of this was taken up in 200 ml. glacial acetic acid and oxidized by gradual addition of a total of 110 ml. 30% $H_2O_2$ (about 5% excess) at 50° C. (first one-half of $H_2O_2$) and at 70–80° C. (second one-half of $H_2O_2$) and finally heated on a steam cone for four hours. Standing for 48 hours, heating for a further 2 hours on a steam cone, cooling and diluting with 1 volume water gave 75 g. crude sulfone as heavy oil and an additional 25 g. product from $CHCl_3$ extraction of the aqueous acetic acid solution. 99.5 g. (97.5% overall yield) of crude 2-chloroethyl phenyl sulfone were obtained which was purified by recrystallization (after seeding) from small amounts of benzene, M.P. 50° C.

83.5 g. of this (0.41 M) were dissolved in 250–300 ml. warm (30–40° C.) benzene and 45 g. $Et_3N$ (10% excess) added dropwise while allowing the reaction to proceed without cooling to attain a temperature of 55–60° C. at the end of the $Et_3N$ addition. After keeping the reaction mixture under gentle reflux for ½ hour, cooling, removing the formed $Et_3NHCl$ by filtration and the excess unreacted $Et_3N$ by washing the benzene solution with dilute HCl and water, drying and stripping 59.8 g. (87% yield) of crude phenyl vinyl sulfone was obtained as a yellow oil. The latter solidified on stirring with a small quantity of petroleum ether and could be recrystallized from $CCl_4$. Two such recrystallizations gave pure phenyl vinyl sulfone, M.P. 69–70° C.

IR reveals strong peaks at 1315 and 1145 $CM^{-1}$ for the sulfone group, peaks such as at 1000 and 975 $CM^{-1}$ for the vinyl group and peaks such as 700 and 685 $CM^{-1}$ for the phenyl group. This material is identified hereinafter as Compound 1.

EXAMPLE 2
*p-Chloro phenyl vinyl sulfone*

115 g. (0.4 M) of p-chloro phenyl disulfide (M. 70–1° C.) were dissolved in 300 ml. of dry chloroform and the solution cooled to $-10°$ C. Into this solution there was introduced 28.4 g. (0.8 g. atom) of dry chlorine gas forming the red sulfenyl chloride in situ. While keeping the obtained solution at approximately $-10°$ C., an excess of dry ethylene gas (excess over 22.44 g., 0.8 M) was introduced until the red solution was completely decolorized, indicating complete addition of the para chloro phenyl sulfenyl chloride across the ethylene double bond. The obtained solution was now allowed to warm to room temperature and stirred for one hour. Removing the solvent in vacuum gave 162 g. of crude 2-chloroethyl p-chloro phenyl sulfide as yellow oil (98% yield).

124 g. (0.6 M) of the obtained para chloro phenyl 2-chloroethyl sulfide were dissolved in 100 ml. of glacial acetic acid and oxidized by adding dropwise with stirring 142.8 g. (1.2 M+5% excess) of 30% aqueous $H_2O_2$. The addition of the first one-half of the $H_2O_2$-solution was carried out at 55–60° C. and the second one-half at 85–90° C. Standing overnight followed by heating of the mixture with stirring for two hours at 95° C. completed the oxidation. While still hot, the mixture was poured into 500 cc. of ice water with stirring, the obtained solid washed with water until free of acetic acid and finally recrystallized from ethanol giving 130 g. (91% yield) of white crystals, M. 98–99° C.

96.5 g. (0.405 M) of the above obtained parachlorophenyl-2-chloroethyl sulfone were dissolved in 500 ml. of benzene, and dehydrochlorinated by dropwise addition with stirring of 43 g. (0.405 M+5% excess) of triethyl amine. Refluxing of the mixture for one and one-half hours and filtration gave 90% of the expected hydrochloride. Washing of the benzene solution with water, dilute HCl, dilute sodium bicarbonate and water in the described succession, drying over anhydrous $MgSO_4$ and removing the solvent in vacuum gave 81.5 g. (99.5% yield) of crude p-chloro phenyl vinyl sulfone as light yellow oil, most of which could be purified by distillation, giving a colorless oil, $B_{0.05}$ 105–6° C., $n_D^{26}$ 1.5675. This material is identified hereinafter as Compound 2.

EXAMPLE 3
*m-Chlorophenyl vinyl sulfone*

30 grams (0.17 mol) of m-chlorophenyl disulfide were converted to the intermediate sulfenyl chloride by diluting with $CCl_4$ and introducing 7.6 grams (0.17 mol) of dry chlorine gas at 10 to 20° C. This solution was then treated with an excess of gaseous ethylene at a temperature which did not exceed 40° C. until all of the sulfenyl chloride had reacted (the orange sulfenyl chloride color disappeared). The product was allowed to stand at room temperature for 48 hours and the solvent removed by stripping to give 43.3 grams (98% yield) of m-chlorophenyl-2-chloroethyl sulfide.

30 grams (0.146 mol) of the m-chlorophenyl-2-chloroethyl sulfide were dissolved in 50 ml. of glacial acetic acid and oxidized by addition of 31 ml. (0.292 mol) of 30% aqueous hydrogen peroxide at 70–90° C. over a period of one-half hour. Stirring for one additional hour at 90° C. (until $H_2O_2$ negative), cooling of the mixture to room temperature and pouring into 2 volumes of water gave a solid, which when taken up in chloroform, dried and stripped gave 30 grams (86% yield) of m-chlorophenyl-2-chloroethyl sulfone which was dried over a drying agent in a vacuum oven.

20 grams (0.08 mol) of the sulfone thus prepared were dissolved in 100 ml. of benzene and dehydrochlorinated by refluxing with 10 grams (0.1 mol) of triethylamine for one hour after addition of the reagent. Standing overnight, washing with dilute HCl, water and dilute sodium bicarbonate, drying and stripping of the benzene gave 9 grams (53% yield) of m-chlorophenyl vinyl sulfone, $B_{0.06}$ 114° C., $n_D^{25}$ 1.5730. This material is identified hereinafter as Compound 3.

EXAMPLE 4
*o-Chlorophenyl vinyl sulfone*

15 grams (0.0523 mol) of o-chlorophenyl disulfide were dissolved in 100 ml. of $CCl_4$ and 3.61 grams (0.0523 mol) of dry chlorine gas introduced under stirring and cooling (25–30° C.). The orange-red solution of the sulfenyl chloride in $CCl_4$ was then treated with dry ethylene gas until the solution was decolorized. After stripping of the resulting mixture, there were obtained 17.5 grams (81% yield) of o-chlorophenyl-2-choroethyl sulfide. In another run 31 more grams of this sulfide were prepared.

31 grams (0.15 mol) of the sulfide product thus prepared were dissolved in 100 ml. of glacial acetic acid, 34 grams (0.3 mol) of 30% aqueous hydrogen peroxide were added dropwise with stirring, the first half at 60–65° C. and the second half at 90–95° C. The mixture was heated on a steam bath for 1–1.5 hours until all of the hydrogen peroxide was consumed. The mixture was cooled and poured into a large excess of water and the precipitated oil taken up in chloroform. The chloroform layer was washed free of acetic acid with water, dried and vacuum stripped to give 34 grams of o-chlorophenyl-2-chloroethyl sulfone.

23.9 grams (0.1 mol) of the sulfone thus prepared were dissolved in 100 ml. of dry benzene and dehydrochlorinated by the addition of 10.2 grams (0.1 mol) of triethylamine at 35 to 40° C. followed by refluxing the mixture for 2 hours. The triethylamine hydrochloride formed was removed by filtration and water washing; the benzene solution was dried and stripped to give 20 grams (99% yield) of o-chlorophenyl vinyl sulfone as a faintly yellow oil, B.$_{0.04}$ 112–113° C., $n_D^{20}$ 1.5756. This material is identified hereinafter as Compound 4.

EXAMPLE 5

2,4-dichlorophenyl vinyl sulfone 29 grams (0.08 mol) of 2,4-dichlorophenyl disulfide dissolved in about 100 ml. of $CCl_4$ were treated with 11.5 grams (0.08 mol) of dry chlorine gas at 0–10° C. for 48 minutes. The sulfenyl chloride formed was converted to 2,4-dichlorophenyl-2-chloroethyl-sulfide by passing dry ethylene into the solution until the red color was removed. Direct stripping gave 41 grams (quantitative yield) of the sulfide.

30 grams (0.124 mol) of the thus prepared sulfide were dissolved in 50 ml. of glacial acetic acid and oxidized by adding a total of 28 grams (0.248 mol) of aqueous 30% hydrogen peroxide, the first half at 65° C., and the second half at 95° C. The mixture was heated at 100° C. for a further 2 hours, allowed to stand overnight at room temperature and poured into 3 volumes of water to give a heavy oil which, when taken up in chloroform, dried and stripped, gave 27.5 grams (81.1% yield) of 2,4-dichlorophenyl-2-chloroethyl sulfone.

20 grams (0.073 mol) of the sulfone thus produced were dissolved in 100 ml. of benzene and treated dropwise with 7.4 grams (0.073 mol) of triethylamine with stirring at 35–45° C. The dehydrochlorination was completed by additional heating at 50° C. for 2 hours. The product was washed with water, dilute hydrochloric acid and water, dried and stripped to give 15 grams (87% yield) of 2,4-dichlorophenyl vinyl sulfone, B.$_{0.04}$ 130–135° C., $n_D^{20}$ 1.5985. This material is identified hereinafter as Compound 5.

EXAMPLE 6

3,4-dichlorophenyl vinyl sulfone 42.5 grams (0.12 mol) of 3,4-dichlorophenyl disulfide were dissolved in 100 ml. of $CCl_4$ and transformed to the sulfenyl chloride by introducing 8.5 grams of dry chlorine gas at 0–5° C. Dry ethylene gas was then introduced at 40–45° C. until all of the sulfenyl chloride had reacted. Direct stripping gave 55 grams (92% yield) of 3,4-dichlorophenyl-2-chloroethyl sulfide.

45 grams (0.186 mol) of this sulfide in 100 ml. of glacial acetic acid was heated to 65° C. and oxidized by adding 21.09 grams of aqueous 30% hydrogen peroxide, the temperature raised to 95° C. and 21.09 grams more of the 30% hydrogen peroxide added. Heating was then continued for another 2 hours at 100° C. The mixture was cooled and the cold mixture poured into water, the precipitated solid dissolved in chloroform after filtration, washed with water and sodium bicarbonate to remove acetic acid, dried and stripped, and 55 grams of pure 3,4-dichlorophenyl-2-chloroethyl sulfone was left.

45 grams (0.164 mol) of the sulfone was dissolved in 100 ml. of benzene and dehydrochlorinated by adding dropwise with stirring 16.6 grams (0.164 mol) of triethylamine. After completion of the addition of triethylamine, the temperature was raised from 45° C. to the reflux temperature and heating continued for an additional two hours. The triethylamine hydrochloride was removed by filtration. Water washing, drying and stripping gave 21 grams (54% yield) of 3,4-dichlorophenyl vinyl sulfone, M.P. 56–58° C. This material is identified hereinafter as Compound 6.

EXAMPLE 7 p-Tolyl vinyl sulfone 36 grams (0.146 mol) of p-tolyl disulfide were dissolved in 200 ml. of chloroform and the solution treated with 10.4 grams (0.292 mol) of chlorine gas at 0 to 5° C. The solution of sulfenyl chloride was treated at about −15° C. with 9 grams (a slight excess) of ethylene gas until the solution was colorless. The solution was allowed to warm to room temperature and stripped in a vacuum, leaving 54.5 grams (quantitative yield) of p-tolyl-2-chloroethyl sulfide as a yellow oil.

44 grams (0.237 mol) of the sulfide thus obtained were dissolved in 100 ml. of glacial acetic acid and treated with 55.2 grams (0.474 mol) of 30% aqueous $H_2O_2$ by dropwise addition at 50–55° C. during the first half of the addition and at 85–90° C. during the second half of the addition. Heating for one more hour at 90° C. and standing overnight completed the oxidation. The mixture obtained was diluted with water to give 51 grams (quantitative yield) of p-tolyl-2-chloroethyl sulfone as a solid which was filtered off and recrystallized from ethanol to a M.P. of 77–78° C.

35 grams (0.16 mol.) of this sulfone were dissolved in 100 ml. of benzene and dehydrochlorinated by dropwise addition of 18 grams (0.16 mol plus a slight excess) of triethylamine with occasional cooling. The dehydrochlorination proceeded very smoothly and was practically complete at the end of a one hour stirring period at room temperature. The benzene solution was washed successively with dilute HCl, water and bicarbonate to remove the triethylamine hydrochloride, dried over anhydrous magnesium sulfate and vacuum stripped. 27.8 grams (93% yield) of p-tolyl vinyl sulfone (Compound 7) were obtained as a white crystalline material which was purified by dissolving in $CCl_4$ and precipitating with petroleum ether, M.P. 59–60° C.

EXAMPLE 8 m-Tolyl vinyl sulfone 39 grams (0.159 mol) of m-tolyl disulfide were dissolved in 200 ml. of chloroform and converted to the sulfenyl chloride by introducing 11.3 grams (0.159 mol) of dry chlorine gas at −20° C. This solution was then decolorized by introducing ethylene gas. Direct stripping of the solution gave 57 grams (quantitative yield) of m-tolyl-2-chloroethyl sulfide as an oil.

42 grams (0.226 mol) of the m-tolyl-2-chloroethyl sulfide were dissolved in 100 ml. of glacial acetic acid and oxidized by dropwise addition of 53.8 grams of 30% aqueous $H_2O_2$, the first half at 55–60° C. and the second half at 85–90° C. Additional heating at 90° C. for 2 hours and standing overnight at room temperature completed the $H_2O_2$ consumption. The product was poured into 2 volumes of water, the precipitated oil taken up into chloroform, the latter washed free of acetic acid with sodium bicarbonate and water, dried and stripped to give 46.5 grams (94% yield) of m-tolyl-2-chloroethyl sulfone as a light brown oil.

36.5 grams (0.168 mol) of the sulfone were dissolved in 100 ml. of benzene. 17 grams (0.168 mol) of triethylamine were added dropwise to the stirred solution at a rate to maintain the temperature at 45–50° C. After the addition of triethylamine was complete, the mixture was warmed at 65–70° C. for one hour, cooled and filtered. The benzene solution was washed with dilute hydrochloric acid and sodium bicarbonate, dried and vacuum stripped to obtain 26.5 grams (86.5% yield) of m-tolyl vinyl sulfone (Compound 8), $B_{0.07}$ 105–107° C., $n_D^{19}$ 1.5520.

EXAMPLE 9 o-Tolyl vinyl sulfone

Into 35 grams (0.142 mol) of o-tolyl disulfide in 150 ml. of chloroform there were introduced 10 grams (0.142 mol) of dry chlorine gas at −15° C. to form the sulfenyl chloride. Then ethylene gas (about 8 grams, an excess) was introduced at −20° C. until the red sulfenyl chloride color disappeared. The colorless solution was vacuum stripped to give 49 grams (93.5%) of o-tolyl-2-chloroethyl sulfide.

39 grams (0.21 mol) of the sulfide were dissolved in 100 ml. of glacial acetic acid and oxidized by dropwise addition of 49.9 grams (5% excess over 2 molar equivalents) of 30% aqueous $H_2O_2$. The first half of the hydrogen peroxide was added at 55–60° C. and the remainder at 85–90° C. The mixture was then heated at 90° C. for another 2 hours and allowed to stand overnight to complete the oxidation. The solution was diluted with 2 volumes of water, the bottom oil taken up with chloroform, the acetic acid removed by washing with sodium bicarbonate and water, dried and stripped to give 47 grams (90% yield) of o-tolyl-2-chloroethyl sulfone.

32 grams (0.147 mol) of this sulfone were dissolved in 100 ml. of benzene and dehydrochlorinated by adding 14.8 grams (0.147 mol) of triethylamine at a rate to maintain the temperature at 45–50° C. The mixture was warmed for 2 hours at 65–70° C. and allowed to stand overnight. The triethylamine hydrochloride was removed by washing with water and dilute hydrochloric acid followed by water, dried and stripped of benzene to give 26 grams (97% yield) of o-tolyl vinyl sulfone (Compound 9) as an orange oil $B_{0.08}$ 109–110° C., $n_D^{20}$ 1.5616.

EXAMPLE 10 p-t-Butylphenyl vinyl sulfone 21 grams (0.0636 mol) of p-t-butylphenyl disulfide (prepared from p-t-butylphenyl mercaptan by oxidation with iodine and having a M.P. of 87–88° C.) were dissolved in 100 ml. of $CCl_4$ and converted to the sulfenyl chloride by introducing 4.52 grams (0.0636 mol) of dry chlorine gas at 25–30° C. with occasional cooling. Ethylene gas was then introduced until all the sulfenyl chloride had reacted as was indicated by the solution's turning from red-orange to colorless. Direct stripping gave 27 grams (93% yield) of p-t-butylphenyl-2-chloroethyl sulfide, $B_{0.07}$ 93–95° C., $n_D^{20}$ 1.5535.

12.2 grams (0.0534 mol) of the sulfide were taken up in 100 ml. of glacial acetic acid and oxidized with dropwise addition of 12.1 grams (0.17 mol) of 30% aqueous $H_2O_2$. Half of the $H_2O_2$ was added at 60–65° C. and the rest at 90–95° C. One hour additional heating on a steam bath, cooling, diluting with water and filtration gave 13.5 grams (97% yield) of p-t-butylphenyl-2-chloroethyl sulfone as white crystals which on recrystallization from aqueous ethanol (1:1) had a M.P. of 103–104° C.

23.5 grams (0.09 mol) of the sulfone were dissolved in 100 ml. of benzene and 0.1 gram of hydroquinone was added as an inhibitor. The sulfone was dehydrochlorinated by dropwise addition with stirring of 9.5 grams (0.09 mol plus a slight excess) of triethylamine at 65–75° C. The mixture was kept at this temperature for 3 hours, cooled and filtered. The filtrate was washed free of unrecated triethylamine with water, dried and stripped. 18 grams of crude p-t-butylphenyl vinyl sulfone were obtained which were purified by recrystallization from ethyl alcohol to give 13.5 grams (75% yield) of pure p-tertiary butylphenyl vinyl sulfone (Compound 10, M.P. 91–92° C.

EXAMPLE 11 p-Nitrophenyl vinyl sulfone 30 grams (0.01 mol) of p-nitrophenyl disulfide were suspended in 150 ml. of $CCl_4$ and the solution saturated with chlorine gas. The mixture was stirred for 4 hours at room temperature and then heated to 70° C. and a slow stream of chlorine gas added during an additional hour. The mixture was cooled to room temperature and the sulfenyl chloride solution formed filtered under suction to remove unconverted disulfide followed by treatment at 45° C. with an excess of ethylene gas. The mixture was stripped and the p-nitrophenyl-2-chloroethyl sulfide recrystallized from ethanol to give a final yield of 22 grams (63% yield) of the pure crystalline product, M.P. 57–58° C.

10 grams (0.046 mol) of the pure sulfide thus prepared were dissolved in 150 ml. of glacial acetic acid and oxidized by dropwise addition of 10.5 grams (0.092 mol) of 30% aqueous $H_2O_2$ at 75–85° C. followed by heating at 95° C. for 2 hours. The mixture was cooled, poured into an excess of water and filtered to give p-nitrophenyl-2-chloroethylsulfone as a solid, M.P. 125° C. which could be recrystallized from ethyl alcohol.

10 grams (0.04 mol) of the sulfone were dissolved in 100 ml. of ethyl alcohol, the temperature raised to 45–50° C. and a solution of 1.7 grams of 97% sodium hydroxide (0.04 mol) in 20 ml. of ethyl alcohol added dropwise over a 20 minute period. One further hour on the steam bath, diluting with water, collecting the formed solid on a filter and washing gave, after drying in vacuum, 7 grams (91% yield) of p-nitrophenyl vinyl sulfone (Compound 11) as a white crystalline solid, M.P. 100° C.

EXAMPLE 12

2,4-dinitrophenyl vinyl sulfone 25 grams (0.107 mol) of 2,4-dinitrophenyl sulfenyl chloride (available commercially from Matheson, Coleman and Bell) were suspended in 100 ml. of chloroform and treated with a large excess of ethylene gas at 50–55° C. for 10 hours. The mixture was allowed to stand at room temperature for 48 hours, filtered and stripped to give 20 grams (76% yield) of 2,4-dinitrophenyl-2-chloroethyl sulfide as yellow needles, M.P. 110–112° C.

13 grams (0.05 mol) of the sulfide were dissolved in 150 ml.of glacial acetic acid and oxidized with 11 grams (0.1 mol of an aqueous 30% $H_2O_2$ solution at 70–75° C. When all of the oxidizing agent had been added, the mixture was held at 95° C. for 2 hours. On standing overnight at room temperature, a crystalline solid was deposited. Diluting with water, filtering and recrystallization from acetone gave 14.5 grams (98% yield) of 2,4-dinitrophenyl-2-chloroethyl sulfone, M.P. 124–125° C.

10 grams (0.034 mol) of the sulfone were taken up in 150 ml. of ethyl alcohol, heated to 40–50° C. and treated with a solution of 1.4 grams of 97% sodium hydroxide in 20 ml. of ethyl alcohol. Two further hours heating at 50° C., diluting with water, filtering off the formed solid, washing with water and drying in vacuum gave 8.6 grams (98% yield) of 2,4-dinitrophenyl vinyl sulfone, M.P. 97° C. Compound 12).

The compounds of the present invention were tested for fungicidal activity in the manner shown below.

In the plate fungicide test the aromatic vinyl sulfones were formulated as wettable powders consisting of 50% of the sulfone, 46% ultra-fine silica (Hi-Sil), 2% sodium lignin sulfonate and 2% Pluronic L-61 (polyethylene oxide-polypropylene oxide adduct) molecular weight about 1,000). This wettable powder is hereinafter designated as Formulation A.

Formulation A was added to agar cultures of the fungi. In Table 1, 10 indicates 100% effectiveness and 0 indicates no effectiveness. The concentrations are expressed in p.p.m. (parts per million) of the sulfone. In the table, Rate A is 1,000 p.p.m., Rate B is 100 p.p.m., and Rate C is 10 p.p.m. The fungi tested were Pythium irregulare, Rhizoctonia, Fusarium lycopersici, Helminthosporium satirum and Alternaria.

In some instances, as indicated in the table, two sets of results were obtained.

Table 1

| Compound | Rate | Rh. | | Fus. | | Hel. | | Py. | | Alt. |
|---|---|---|---|---|---|---|---|---|---|---|
| 1 | A | 8 | 8 | 8 | 10 | 8 | 8 | 9 | 10 | 8 |
|   | B | 8 | 8 | 8 | 10 | 8 | 8 | 9 | 10 | 6 |
|   | C | 5 | 5 | 0 | 0 | 5 | 5 | 5 | 10 | 0 |
| 2 | A | 8 | 10 | 8 | 10 | 8 | 10 | 8 | 10 | 8 |
|   | B | 8 | 10 | 8 | 10 | 8 | 10 | 8 | 10 | 8 |
|   | C | 3 | 3 | 5 | 5 | 8 | 10 | 8 | 10 | 5 |
| 3 | A | 10 | | 10 | | 10 | | 10 | | |
|   | B | 10 | | 10 | | 10 | | 10 | | |
|   | C | 10 | | 10 | | 10 | | 10 | | |
| 4 | A | 10 | | 10 | | 10 | | 10 | | |
|   | B | 10 | | 10 | | 10 | | 10 | | |
|   | C | 10 | | 10 | | 10 | | 10 | | |
| 5 | A | 10 | | 10 | | 10 | | 10 | | |
|   | B | 10 | | 10 | | 10 | | 10 | | |
|   | C | 10 | | 10 | | 10 | | 10 | | |
| 6 | A | 10 | | 10 | | 10 | | 10 | | |
|   | B | 10 | | 10 | | 10 | | 10 | | |
|   | C | 10 | | 10 | | 10 | | 10 | | |
| 7 | A | 8 | 10 | 8 | 10 | 8 | 10 | 8 | 10 | 8 |
|   | B | 8 | 10 | 8 | 10 | 8 | 10 | 8 | 10 | 8 |
|   | C | 0 | 0 | 5 | 8 | 0 | 0 | 0 | 0 | 0 |
| 8 | A | 8 | 10 | 8 | 8 | 8 | 8 | 8 | 10 | 8 |
|   | B | 7 | 10 | 7 | 10 | 5 | 5 | 8 | 10 | 5 |
|   | C | 0 | 0 | 0 | 0 | 0 | 0 | 0 | 0 | 0 |
| 9 | A | 8 | 10 | 8 | 10 | 8 | 10 | 8 | 10 | 8 |
|   | B | 7 | 10 | 8 | 10 | 8 | 10 | 8 | 10 | 5 |
|   | C | 0 | 0 | 5 | 5 | 5 | 5 | 5 | 5 | 0 |
| 10 | A | 10 | | 10 | | 10 | | 10 | | |
|    | B | 10 | | 10 | | 10 | | 10 | | |
|    | C | 10 | | 10 | | 10 | | 10 | | |
| 11 | A | 8 | | 0 | | 10 | | 10 | | |
|    | B | 0 | | 0 | | 0 | | 0 | | |
|    | C | 0 | | 0 | | 0 | | 0 | | |
| 12 | A | 10 | | 5 | | 8 | | 10 | | |
|    | B | 5 | | 0 | | 0 | | 0 | | |
|    | C | 0 | | 0 | | 0 | | 0 | | |

The most active materials were the mono- and dichlorophenyl vinyl sulfones and the t-butylphenyl vinyl sulfone. These materials were more effective than commercially available fungicides such as Dyrene, Ceresan and Captan. Phenyl vinyl sulfone and the tolyl vinyl sulfones were as effective as such commercial fungicides. In contrast, diphenyl sulfone and bis (p-chlorophenyl) sulfone were virtually ineffective as fungicides in a similar test.

Spore germination tests were carried out as set forth in Table 2. A 1% suspension of the sulfone in water (10,000 p.p.m.) was prepared and there was also prepared a solution of agar in water. The sulfone suspension was appropriately diluted with water and mixed with the agar solution to give concentrations of sulfone of 1,000 p.p.m. (Rate A), 100 p.p.m. (Rate B) and 10 p.p.m. (Rate C). 0.3 ml. of the agar material was placed on a microscope slide and a film allowed to form and solidify. Spores of Alternaria spp. were dusted on the slides and they were placed in Petri dishes with filter paper and incubated at room temperature for 24 hours. The percent of nongerminated spores was recorded as against a control slide of pure agar containing the spores. 100% nongermination is recorded as 10, 80% nongermination is recorded as 8 and so on to 0 for complete germination.

Table 2

| Compound | Rate A | Rate B | Rate C |
|---|---|---|---|
| 1 | 8 | 5 | 2 |
| 2 | 10 | 10 | 8 |
| 3 | 10 | 10 | 8 |
| 4 | 10 | 8 | 8 |
| 5 | 10 | 10 | 8 |
| 6 | 8 | 8 | 8 |
| 7 | 10 | 8 | 5 |
| 8 | 8 | 4 | 2 |
| 9 | 10 | 5 | 2 |
| 10 | 10 | 7 | 4 |
| 11 | 5 | 2 | 2 |
| 12 | 4 | 2 | 2 |
| Dyrene | 10 | 10 | 7 |

All of the chlorophenyl vinyl sulfones were as good as or slightly better than the commercial material Dyrene.

The compounds were also tested as soil fungicides. 2 grams of the sulfone were mixed with an equal weight of attapulgus clay (Attaclay). This mixture was then blended with soil infested with Pythium. 100 mg. of the sulfone in 500 grams of soil is equal to 200 lbs./acre. After blending with the soil, the mixture was allowed to stand for 24 hours. Then the blend was spread evenly over a wet paper towel and 50 pea seeds were placed on the soil. The towels were rolled up and put in metal cans and stored at 40° F. for 5 days and then at 75° F. for 4 days. The cans were then removed and the rate of fungus growth recorded, with 10 indicating no growth (or perfect control), and 0 indicating complete growth (no control). The results are set forth in Table 3.

Table 3

| Compound | 200 lbs./acre | 50 lbs./acre |
|---|---|---|
| 1 | 9 | 8 |
| 2 | 10 | 8 |
| 3 | 9 | 7 |
| 4 | 9 | 7 |
| 5 | 4 | 1 |
| 6 | 8 | 3 |
| 7 | 9 | 6 |
| 8 | 9 | 6 |
| 9 | 9 | 2 |
| 10 | 0 | 0 |
| 11 | 0 | 0 |
| 12 | 0 | 0 |

The monochlorophenyl vinyl sulfones were superior to B-1843 trans bis (n-propylsulfonyl) ethylene, an outstanding soil fungicide. Phenyl vinyl sulfone also gave excellent results in this test.

We claim:

1. A process of killing fungi comprising applying to the habitat of the fungi a fungicidally effective amount of a sulfone having the formula $RSO_2CH=CH_2$ where R is selected from the group consisting of carbocyclic aryl, halocarbocyclic aryl, nitrocarbocyclic aryl, halonitrocarbocyclic aryl and alkoxycarbocyclic aryl.

2. A process of killing fungi comprising applying to the habitat of the fungi a fungicidally effective amount of monocyclic carbocyclic aryl vinyl sulfone.

3. A process of killing fungi comprising applying to the habitat of the fungi a fungicidally effective amount of phenyl vinyl sulfone.

4. A process of killing fungi comprising applying to the habitat of the fungi a fungicidally effective amount of alkylphenyl vinyl sulfone.

5. A process according to claim 4 wherein the alkylphenyl group has 1 to 8 carbon atoms in the alkyl portion thereof.

6. A process according to claim 4 wherein the alkylphenyl group is the tolyl group.

7. A process according to claim 4 wherein the alkylphenyl group is t-butylphenyl.

8. A process of killing fungi comprising applying to the habitat of the fungi a fungicidally effective amount of mono to dihalophenyl vinyl sulfone.

9. A process of killing fungi comprising applying to the habitat of the fungi a fungicidally effective amount of monochlorophenyl vinyl sulfone.

10. A process of killing fungi comprising applying to the habitat of the fungi a fungicidally effective amount of dichlorophenyl vinyl sulfone.

(References on following page)

References Cited by the Examiner

UNITED STATES PATENTS

| | | | |
|---|---|---|---|
| 2,045,925 | 6/1936 | Remy | 167—22 |
| 2,140,608 | 12/1938 | Ufer | 167—22 |
| 2,474,808 | 7/1949 | Schoene | 167—22 |
| 2,623,838 | 12/1952 | Bender | 167—30 |
| 2,634,202 | 4/1953 | Fincke | 167—22 |
| 2,793,234 | 5/1957 | Metivier | 167—22 |
| 2,812,281 | 11/1957 | Meltzer | 167—30 |
| 2,953,319 | 9/1960 | Uhlenbroek | 167—30 |
| 2,968,678 | 1/1961 | Oswald | 167—30 |

OTHER REFERENCES

King, U.S. Dept. Agr. Handbook, No. 69, May 1953, page 319.

JULIAN S. LEVITT, *Primary Examiner.*

SAM ROSEN, *Examiner.*

G. A. MENTIS, *Assistant Examiner.*